United States Patent
Ouchi et al.

(10) Patent No.: US 7,423,660 B2
(45) Date of Patent: Sep. 9, 2008

(54) IMAGE DISPLAY APPARATUS, METHOD AND PROGRAM

(75) Inventors: Akihiro Ouchi, Tokyo (JP); Shigehiro Kadota, Tokyo (JP); Akihiro Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/939,610

(22) Filed: Sep. 13, 2004

(65) Prior Publication Data

US 2005/0068342 A1    Mar. 31, 2005

(30) Foreign Application Priority Data

Sep. 26, 2003    (JP)    ............... 2003-335642

(51) Int. Cl.
*G09G 5/00*    (2006.01)
(52) U.S. Cl. .................. 345/684; 345/676; 345/661; 345/634
(58) Field of Classification Search ................. 345/684, 345/688, 660, 661, 634; 715/786, 787
See application file for complete search history.

(56) References Cited

U.S. PATENT DOCUMENTS

| | | | | |
|---|---|---|---|---|
| 5,553,225 A | * | 9/1996 | Perry | 715/786 |
| 6,069,626 A | * | 5/2000 | Cline et al. | 715/786 |
| 6,411,274 B2 | * | 6/2002 | Watanabe et al. | 715/786 |
| 6,772,433 B1 | * | 8/2004 | LaJoie et al. | 725/52 |
| 2002/0175924 A1 | | 11/2002 | Yui et al. | |
| 2003/0043174 A1 | * | 3/2003 | Hinckley et al. | 345/684 |
| 2004/0039934 A1 | * | 2/2004 | Land et al. | 713/200 |

FOREIGN PATENT DOCUMENTS

| | | | |
|---|---|---|---|
| JP | 2000163028 A | * | 6/2000 |
| JP | 2000-242257 | | 9/2000 |
| JP | 2002-244631 | | 8/2002 |

* cited by examiner

*Primary Examiner*—Ryan R Yang
(74) *Attorney, Agent, or Firm*—Canon U.S.A. Inc., I.P. Division

(57) ABSTRACT

An image display apparatus connected in a communication-enable manner to an information processing unit for processing image data and outputting an image signal, wherein the image display apparatus receives the image signal and displays an image. The image display apparatus comprises an on-screen display generating unit for generating the image, a coordinate input unit for providing position information based on pointing on a display screen, and a control unit for controlling the on-screen display generating unit to generate and display a scroll bar, and controlling the image signal output from the information processing unit in accordance with an input for an area of the scroll bar from the coordinate input unit.

10 Claims, 8 Drawing Sheets

IMAGE DISPLAY APPARATUS, METHOD AND PROGRAM

CROSS REFERENCED TO RELATED APPLICATIONS

This application claims priority from Japanese Patent Application No. 2003-335642 filed Sep. 26, 2003, which is hereby incorporated by reference herein.

BACKGROUND OF THE INVENTION

1. Field of the Invention

The present invention relates to an image display system comprising an information processing unit for processing image data and outputting an image signal, and an image display apparatus for receiving the image signal and displaying an image. More particularly, the present invention relates to an image display system in which an image display apparatus has coordinate input means for inputting position information on a display screen.

2. Description of the Related Art

Recently, there have been increased opportunities (e.g., in meetings, presentations and so on) for providing, to third parties, various types of data such as textual data, tables, and graphical data, which are prepared using application software for a personal computer. The various types of data can be provided (displayed) to the third parties using a large screen display (image display device), e.g., a front projector or a rear projector. In such a case, the display is connected to a video output terminal of the personal computer, and image data produced by the personal computer is displayed on a full-size screen of the display.

For the purpose of enhancing an appealing effect in meetings, presentations and so on, a part of an image displayed on a screen is often scaled up. This scaling-up is realized with a zoom function provided in the application software of the personal computer. Also, some displays have the zoom function in themselves. When utilizing the zoom function of the display itself, an image magnified at a certain scale-up rate about a screen position/screen coordinates, e.g., the screen center, as a base point is displayed by operating keys on the display or a remote control. Then, when an image position for scaling-up is to be shifted, a display area is shifted up, down, to the right or to the left by operating cursor keys on the display or the remote control.

A known system includes a digitizer (coordinate input device) capable of directly instructing coordinates on a display screen to display by an instruction means, such as a finger or a pen, and providing a pointing means with a similar function to that of a mouse of the personal computer.

There are various types of digitizers, including: a type having a pressure sensor within a display screen of the display which detects pressure caused upon contact of a pen, etc.; an electromagnetic induction type using a pen generating a magnetic field and detecting the magnetic field by a sensor disposed within a display screen; an ultrasonic surface elastic wave type having an ultrasonic transmitter and an ultrasonic sensor disposed in, e.g., a frame of a display screen, thereby detecting an object position on the display screen; and an infrared type using a pen emitting an infrared ray and receiving the emitted infrared ray by a sensor disposed within a display screen.

Any of the above-described types of digitizers can provide pointing information (position information) to the personal computer upon direct instruction on the display screen, and hence enables the personal computer to be operated in an intuitively matching way.

In cases such as described above, the digitizer and the personal computer are interconnected by an interface cable through which the pointing information is transmitted and received. Interface types include a serial interface used for connection of a mouse, a PS/2 interface, and a USB interface.

Driver software for reflecting the pointing information on the display screen, which is input through the interface cable, in movement of a cursor or the like is installed in the personal computer beforehand. As an alternative, such specific driver software is not needed if the pointing information from the digitizer is converted to standard mouse information.

An operating system (OS), e.g., Windows® 2000 made by Microsoft® runs in the personal computer. A plurality of windows for executing applications of a word processor and a spreadsheet, icons for starting up the applications, etc. are displayed on a display screen produced by the personal computer.

Further, a cursor image indicating a pointed position is produced on the display screen of the personal computer, and selection and movement of windows and icons are performed by instructing coordinates by the cursor.

When scaling up a part of the display image for the purpose of emphasis, however, resorting to the zoom function of applications installed in the personal computer, as described above, is disadvantageous because some of the applications do not have the zoom function.

When employing a display with the zoom function, a part of the display image can be scaled up without resorting to the applications installed in the personal computer, but it is hard to confirm the location of the current position of a scaled-up image. In addition, operations for displaying a scaled-up image and shifting a scale-up area after displaying the scaled-up image must be performed using the cursor keys on the display or the remote control. Thus, an intuitively matching operation cannot be performed.

On the other hand, a display provided with a digitizer is conceivable as one solution for providing the intuitively matching operation. However, coordinate pointing by such a digitizer provides only similar operations to those obtained by a mouse on the personal computer, and cannot perform the zoom function specific to the display and the operation for shifting a scale-up area after displaying a scaled-up image. Thus, convenience in use is not satisfactory.

SUMMARY OF THE INVENTION

The present invention has been made in the view of the problems set forth above, and is intended to provide an image display system provided with a display having a coordinate input unit that can handle a scaled-up display image with improved operability. More specifically, the present invention is intended to provide an image display system with higher operability by realizing, in a display having a coordinate input unit, that position information of a scaled-up image relative to an original image is visually indicated, and display of the scaled-up image and shift of a scale-up area of the scaled-up image are performed in an intuitively matching way.

According to an aspect of the present invention, an image display apparatus is connected in a communication-enable manner to an information processing unit for processing image data and outputting an image signal, the image display apparatus receives the image signal and displays an image. The image display apparatus comprises: an on-screen display generating unit for generating the image; a coordinate input unit for providing position information based on pointing on a display screen; and a control unit for controlling the on-screen display generating unit to generate and display a scroll bar, and controlling the image signal output from the information processing unit in accordance with an input for an area of the scroll bar from the coordinate input unit.

According to another aspect of the present invention, an image display system comprises an information processing unit for processing image data and outputting an image signal and an image display apparatus for receiving the image signal and displaying an image. The image display system comprises an on-screen display generating unit for generating the image; a coordinate input unit for providing position information based on pointing on a display screen; and a control unit for controlling the on-screen display generating unit to generate and display a scroll bar, and controlling the image signal output from the information processing unit in accordance with an input from the coordinate input unit for an area of the scroll bar.

Further, according to another aspect of the present invention, an image display method establishes a connection in a communication-enable manner to an information processing unit for processing image data and outputs an image signal, receives the image signal, and displays an image. The image display method comprises generating the image; displaying the image on a display screen; generating a scroll bar; displaying the scroll bar on the display screen; obtaining position information based on pointing on the display screen; and controlling the image signal output in accordance with position information for an input for an area of the scroll bar.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described below with reference to the accompanying drawings.

First Embodiment

Figure 1:
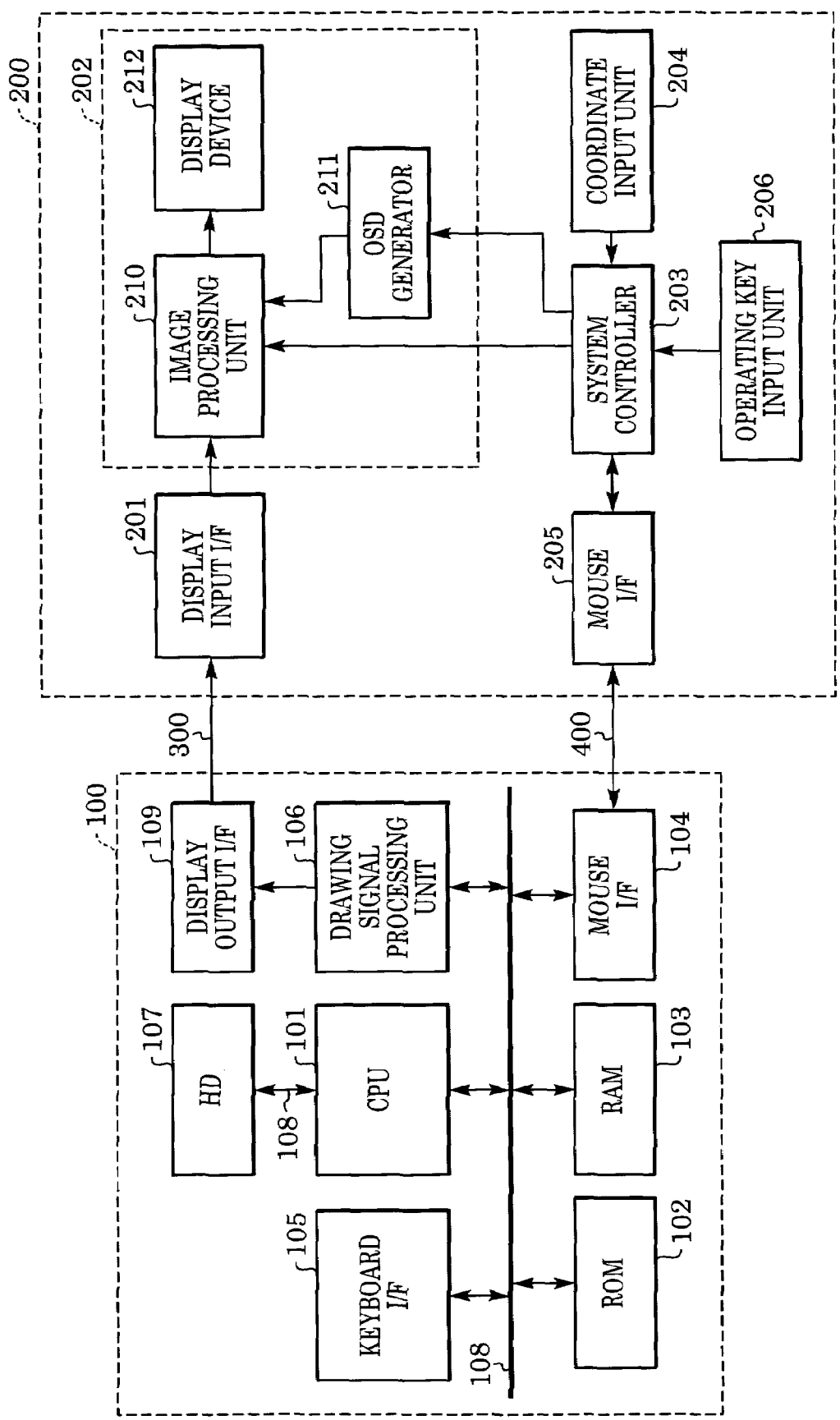
FIG. 1 is a block diagram schematically showing a configuration of an image display system according to a first embodiment of the present invention.

FIG. 1 is a block diagram schematically showing a configuration of an image display system according to a first embodiment of the present invention. A personal computer (PC) 100 acts as an information processing unit and is connected to an image display apparatus 200 via a video cable 300 and a communication cable 400.

The PC 100 comprises: a central processing unit (CPU) 101 for controlling the entire system and executing various kinds of processing; a read-only memory (ROM) 102 for storing programs executed by the CPU 101; a random-access memory (RAM) 103 for storing data, etc. used by the CPU 101; a mouse interface (I/F) 104; a keyboard interface 105; a drawing signal processing unit 106; a hard disk (HD) 107; and a display output interface 109. These components are interconnected via a system bus 108.

A coordinate input device, such as a mouse, is typically connected to the mouse interface 104 such that coordinate information for controlling display of a pointer on a PC screen is supplied to the CPU 101. Also, when a click signal is detected, it is supplied as a command signal to the CPU 101. In the embodiment shown in FIG. 1, the mouse interface 104 of the PC 100 is connected to a mouse interface 205 of the image display apparatus 200.

A keyboard (not shown) is connected to the keyboard interface 105 for supplying, to the CPU 101, input information corresponding to key-in operations.

In accordance with the coordinate information and commands input from the coordinate input device or the keyboard, the CPU 101 executes processing, such as reading data from and recording data to the hard disk 107, the ROM 102 and the RAM 103. Data read by the CPU 101 from the hard disk 107 is stored in the RAM 103 constituted as a work area and is subjected to various kinds of data processing in accordance with user operations, etc. The data stored in the RAM 103 is read out to the drawing signal processing unit 106 to produce an image signal that is output to the image display apparatus 200 via the display output interface 109.

The image display apparatus 200 comprises a display input interface 201, an image display block 202, a system controller 203, a coordinate input unit 204, a mouse interface 205, and an operating key input unit 206. The image display block 202 comprises an image processing unit 210, an OSD (on-screen display) generator 211, and a display device 212.

In the system configuration shown in FIG. 1 and described above, the image signal output from the PC 100 is input to the image processing unit 210 via the video cable 300 and the display input interface 201. The image processing unit 210 executes processing, such as optimization of a location in an image memory (not shown) where the input image signal is taken in, and optimization of resolution of the input image signal to resolution of the display device 212, and then displays an image by the display device 212. The system controller 203 controls the processing, such as the optimization of the taken-in location of the input image signal and the optimization to resolution of the display device 212. The OSD generator 211 generates a desired image under control of the system controller 203, and displays it after synthesis with the input image signal in the image processing unit 210. The system controller 203 receives signals from the coordinate input unit 204 and the operating key input unit 206, and then executes control corresponding to the respective functions. Further, under control of the system controller 203, the mouse interface 205 outputs the coordinate information input from the coordinate input unit 204 to the PC 100 via the communication cable 400 in accordance with process flow described below. The PC 100 handles the received coordinate information similarly to the coordinate information input from the mouse such that the coordinate information can be processed by application software, etc. running in the PC 100.

Figure 2:
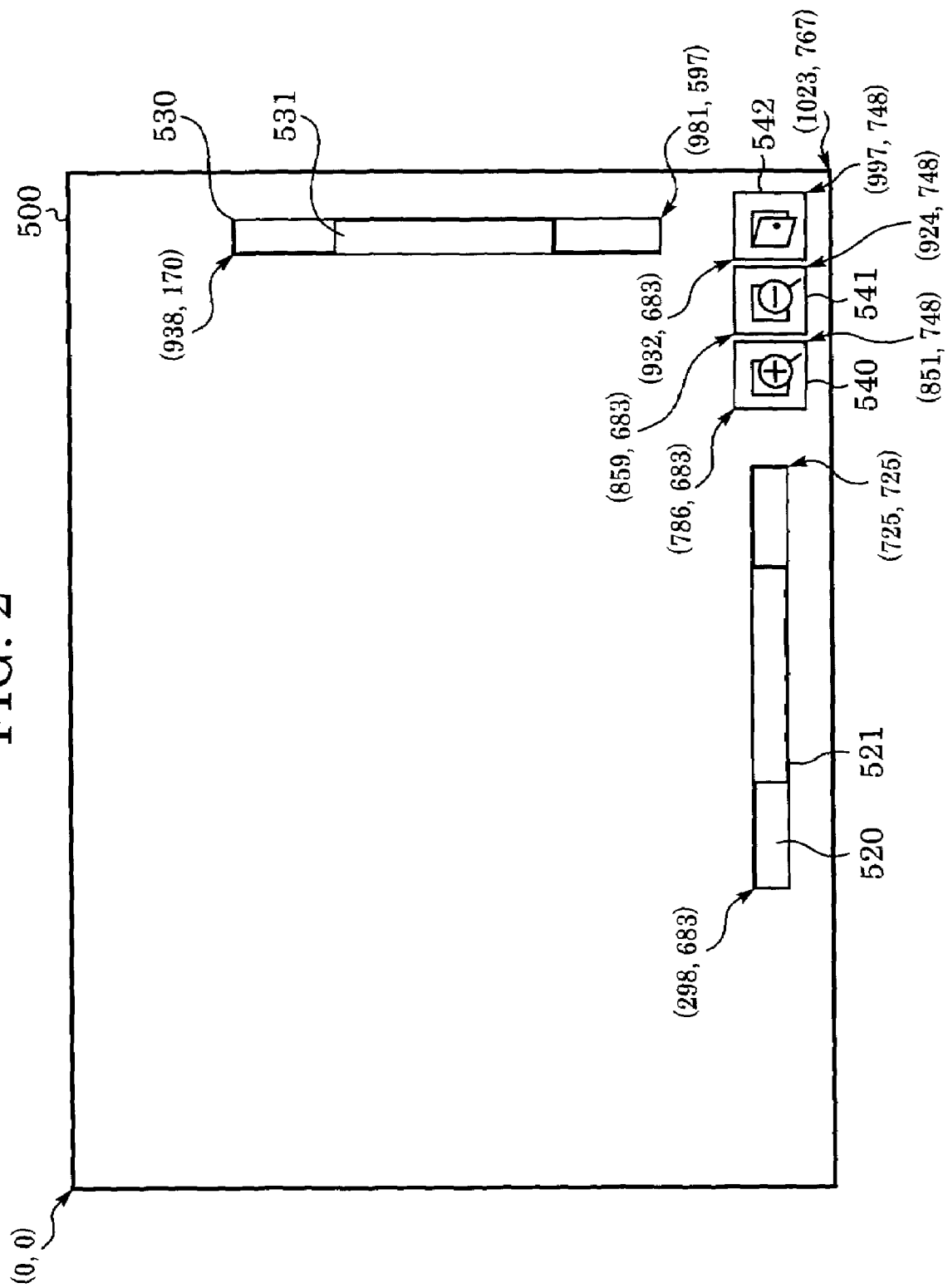
FIG. 2 shows display information when an image is scaled up.

Here, when a scale-up display mode is set by the operating key input unit 206, the image processing unit 210 executes processing to scale up a portion of the input image, and the OSD generator 211 generates an image, such as the one shown in FIG. 2, and displays it after synthesis with the scaled-up display image.

Referring to FIG. 2, a display screen 500 is shown. The display screen 500 includes images displayed as OSD images including: a scroll bar 520 and a slicer 521 for shifting the scale-up area in the horizontal direction; a scroll bar 530 and a slicer 531 for shifting the scale-up area in the vertical direction; a zoom-up icon 540; a zoom-down icon 541; and a zoom function ending icon 542.

It is assumed herein that the display device 212 has 1024 pixels as the number of horizontal pixels and 768 lines as the number of vertical lines, and that an upper left corner of the screen has coordinates (0, 0) and a lower right corner of the screen has coordinates (1023, 767). In such a coordinate system, the exemplary display shown in FIG. 2 includes: the horizontal scroll bar 520 displayed in an area from coordinates (298, 683) to (725, 725); the vertical scroll bar 530 displayed in an area from coordinates (938, 170) to (981, 597); the zoom-up icon 540 displayed in an area from coordinates (786, 683) to (851, 748); the zoom-down icon 541 displayed in an area from coordinates (859, 683) to (924, 748); and the zoom function ending icon 542 displayed in an area from coordinates (932, 683) to (997, 748).

The coordinates pointed within the areas for the scroll bars 520, 521 and icons 540, 541, 542 are processed by the system controller 203 as commands for executing the respective functions, while the coordinates pointed outside those areas are utilized as coordinate information for the PC 100.

Figure 3:
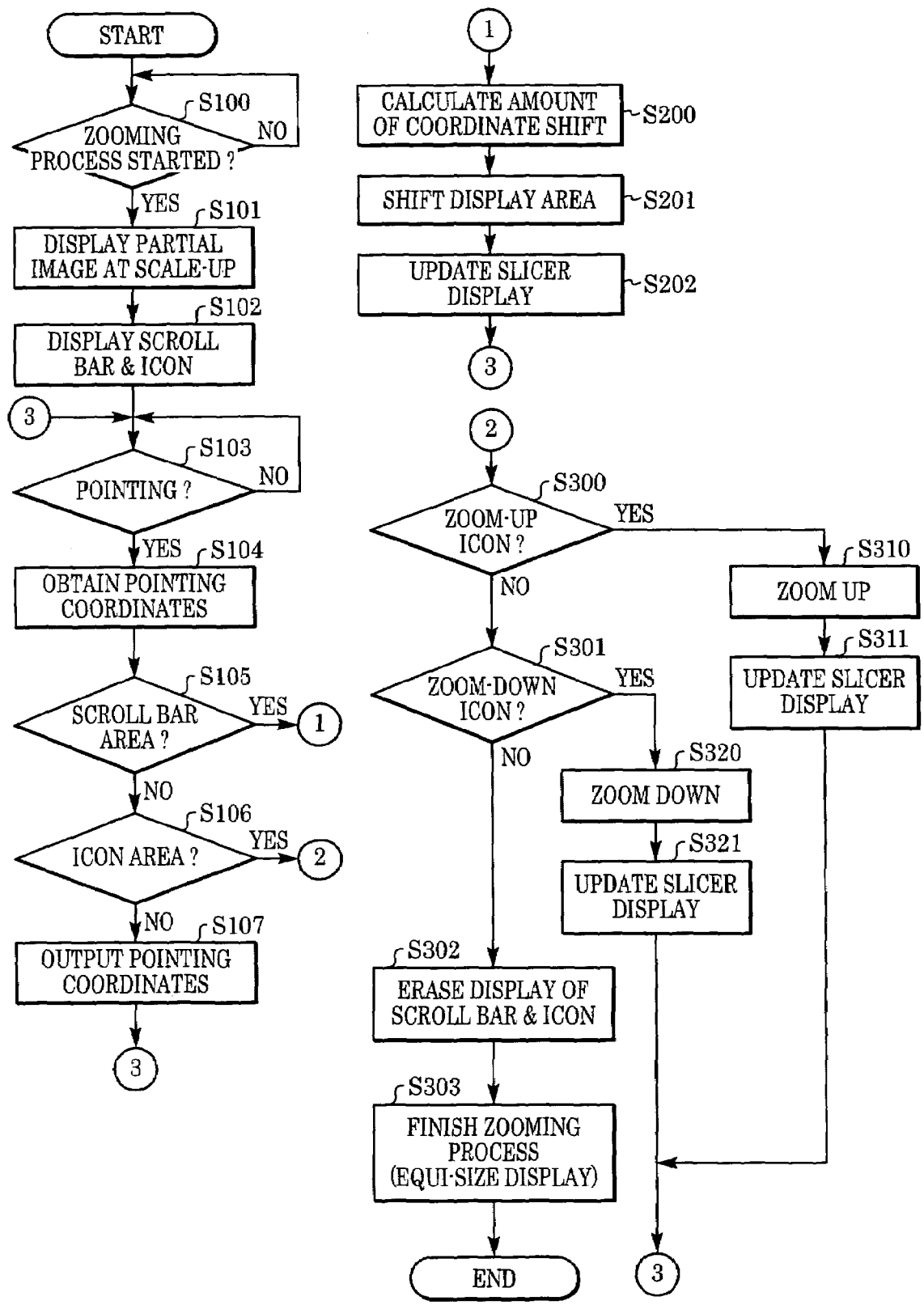
FIG. 3 is a flowchart showing control flow of an image scaling-up process executed by the image display system according to a first embodiment of the present invention.

In exemplary embodiments, display control, for a display such as the one shown in FIG. 2, can be executed in accordance with a flowchart shown in FIG. 3. If the scale-up display (zoom-up) mode is selected in step S100 with operation of the operating key input unit 206, the control flow proceeds to step S101 where a portion of the input image signal is displayed at scale-up. Then, the control flow proceeds to step S102 where the scroll bars 520, 530 and the icons 540, 541, 542 are displayed. At this time, it is assumed that a scale-up rate of the scaled-up image is two times and that the scale-up area is set at the screen center of the display screen. As described above, selecting the scale-up display mode may be done via the operating key input unit 206 and key-in operation. However, selection of the scale-up display mode is not limited to these input devices. For example, selection of the scale-up display could be performed via a remote control (not shown) or a touch screen display.

Figure 4:
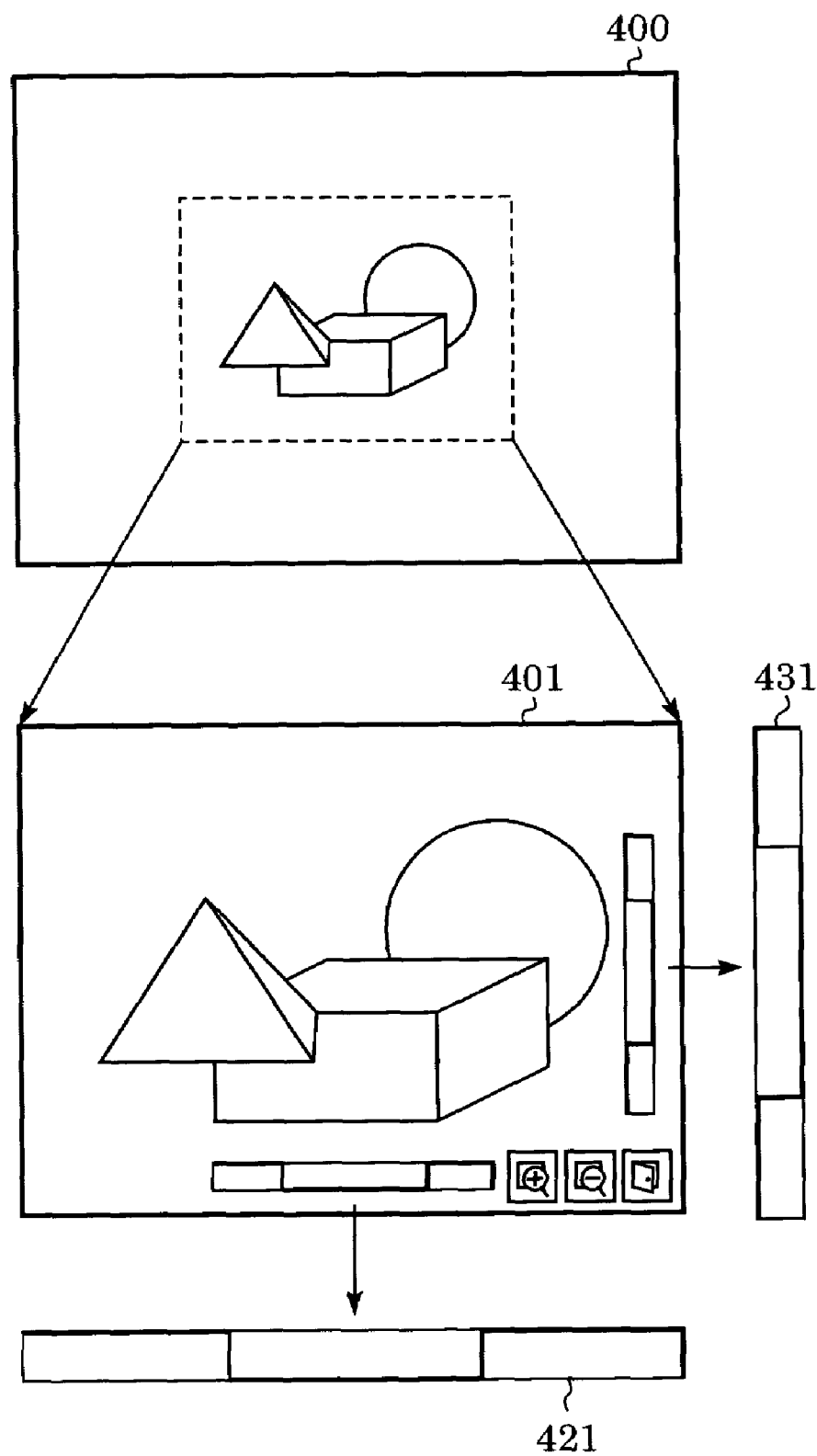
FIG. 4 is an illustration showing a screen image displayed in a twice scale-up display mode.

In step S102, the OSD generator 211 of the image display apparatus 200 generates the scroll bars 520, 521 and the icons 540, 541, 542 shown in FIG. 2, and displays them in superimposed relation to the scaled-up image. FIG. 4 shows the image displayed at this time. The image shown in FIG. 4 shows an input image 400 and a twice scaled-up image 401. FIG. 4 also shows the horizontal scroll bar 421 and the vertical scroll bar 431.

The control flow proceeds to step S103 where it is determined whether pointing has been indicated. If pointing has not been indicated, the control system waits for the next operation (pointing indication) while the current display remains as it is. If pointing has been indicated, the control flow proceeds to step S104 where pointing coordinates are obtained. The system controller 203 of the image display apparatus 200 determines whether the obtained coordinates are within the scroll bar area (step S105) or the icon area (step S106).

Figure 5:
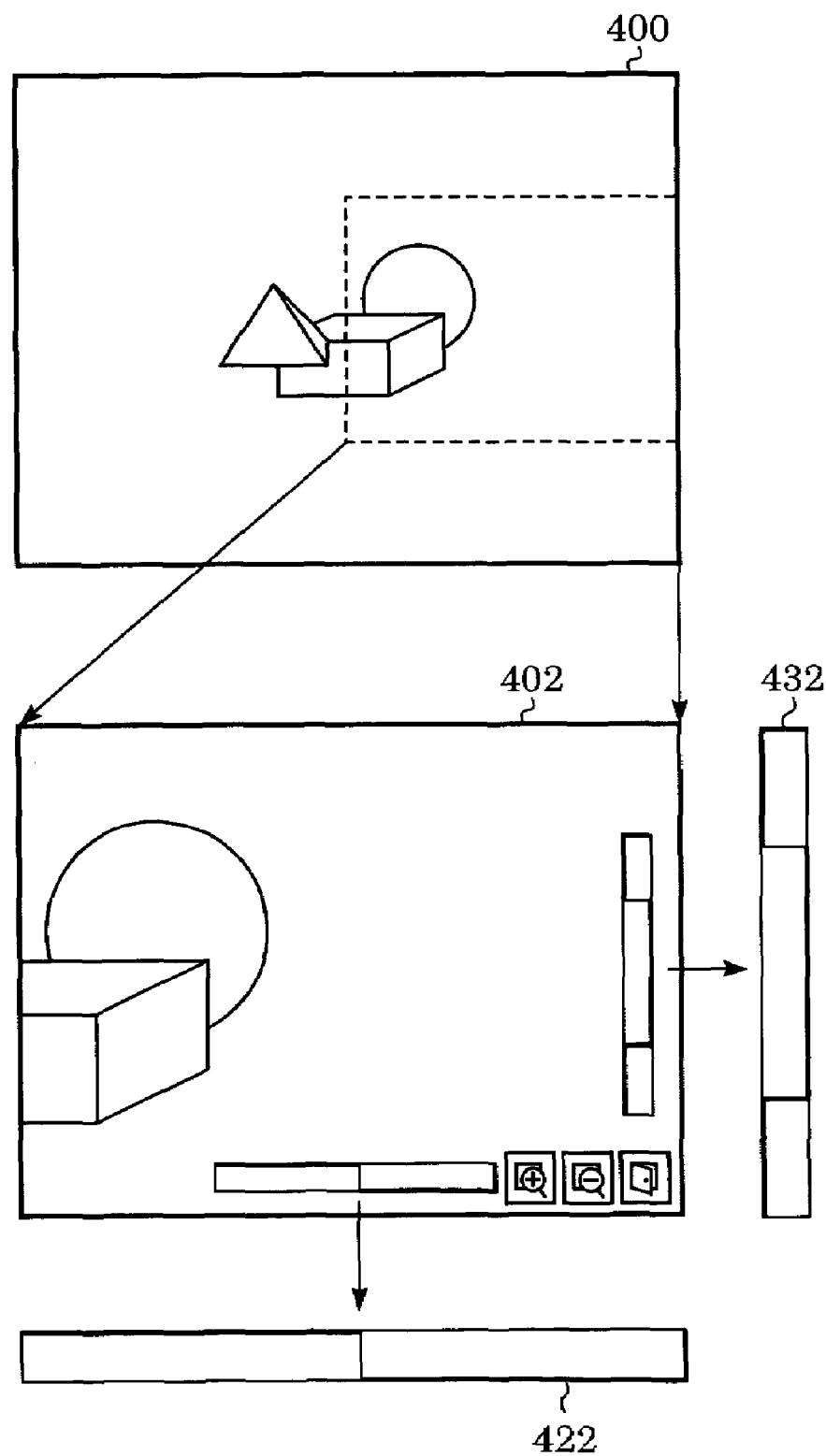
FIG. 5 is an illustration showing a screen image displayed when a display area is shifted in the twice scale-up display mode.

If it is determined in step S105 that the obtained coordinates are within the scroll bar area, this is regarded as an operation command for shifting the scale-up display area, and the control flow proceeds to step S200 where the system controller 203 calculates a shift amount using the obtained coordinates. Calculation of the coordinate shift amount can be made, for example, by a method of calculating it as a shift amount of the pointing coordinates within the scroll bar area, or a method of converting the distance from the center coordinates of the slicer to the pointing coordinates into a shift amount. Therefore, the method of calculating the coordinate shift amount is not limited to a particular method. The control flow then proceeds to step S201 where the display area of the scaled-up image is shifted in accordance with the shift amount calculated in step S200. FIG. 5 shows the display image after being horizontally shifted from the state of FIG. 4. Next, the control flow proceeds to step S202 where display of the slicer position relative to the scroll bar is updated in accordance with the shift amount (as shown in FIG. 5). The control flow then returns to step S103.

Figure 6:
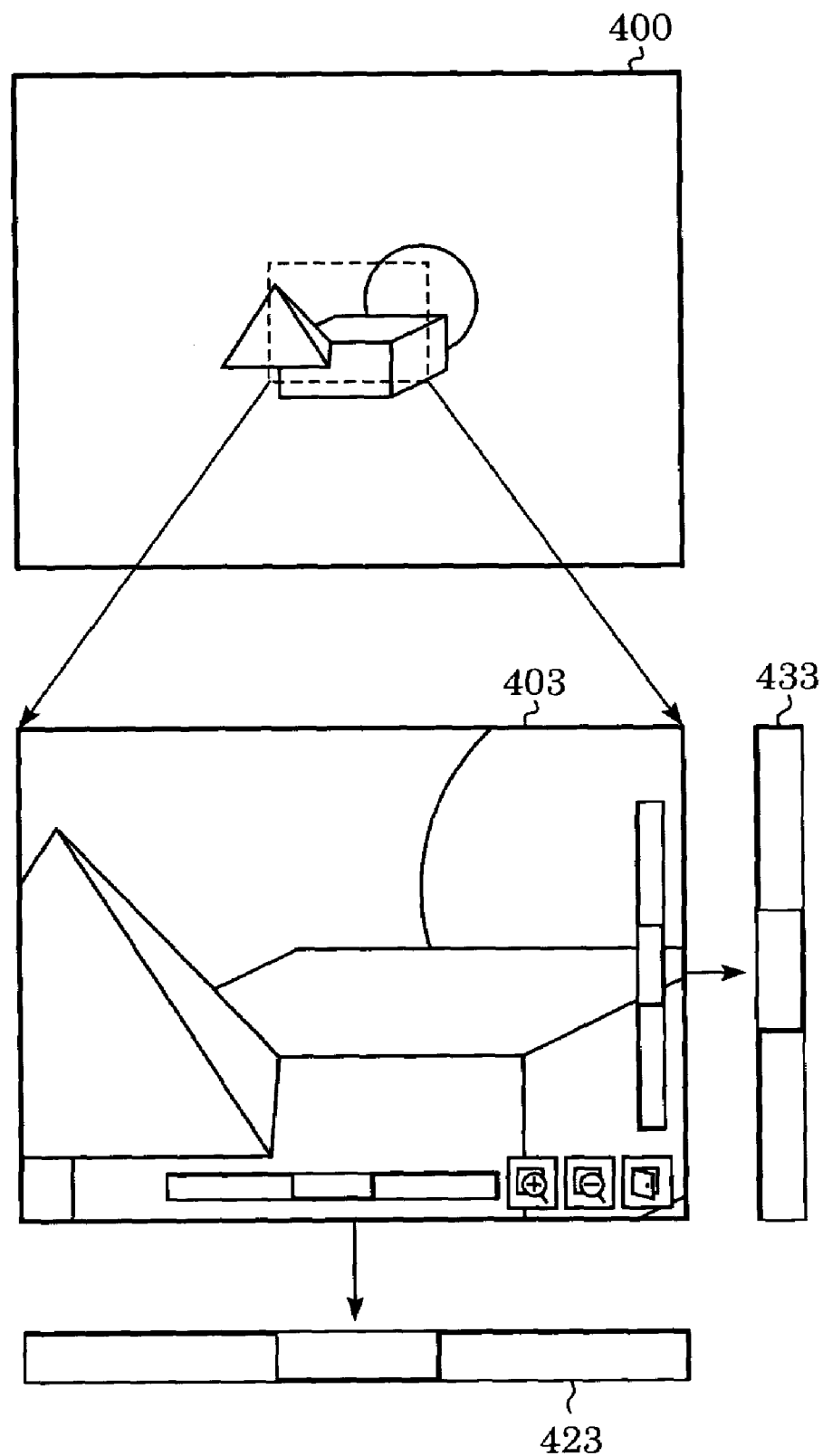
FIG. 6 is an illustration showing a screen image displayed in a four-time scale-up display mode.

If it is determined in step S106 that the obtained coordinates are within the icon area, the system controller 203 determines whether the obtained coordinates are within the zoom-up icon area 540 (step S300) or the zoom-down icon area 541 (step S301). If it is determined in step S300 that the obtained coordinates are within the zoom-up icon area 540, the control flow proceeds to step S310 where a rescaling-up process of the display image is executed. FIG. 6 shows the display image after being zoomed up from the state of FIG. 4. A scale-up rate in this rescaling-up process can be optionally set, but it is assumed herein to be two times. The control flow then proceeds to step S311 where a proportion of the displayed slicer to the scroll bar is updated corresponding to the zoom-up (as shown in FIG. 6). The control flow then returns to step S103.

If it is determined in step S301 that the obtained coordinates are within the zoom-down icon area 541, the control flow proceeds to step S320 where a scaling-down process from the scale-up display is executed. A scale-down rate in this scaling-down process can be optionally set, but it is assumed herein to be ½. The control flow then proceeds to step S321 where a proportion of the displayed slicer to the scroll bar is updated corresponding to the zoom-down rate. The display image after being zoomed-down from the state of FIG. 6 corresponds to the display image shown in FIG. 4. The control flow then returns to step S103.

If it is determined that neither the zoom-up icon area 540 (no in step S300) nor the zoom-down icon area 541 (no in step S301) have been pointed to, the obtained coordinates are regarded as being within the zoom-function ending icon area 542, and the control flow proceeds to step S302. In step S302, the displayed scroll bars and icons are erased. Then, the control flow proceeds to step S303 where the zooming display is brought to an end by resetting the image display mode to an equi-size display mode of displaying the input image as it is. If it is determined in step S105 that the obtained coordinates are not within the scroll bar area and it is determined in step S106 that the obtained coordinates are not within the icon area, the pointing coordinates are output in step S107 to the personal computer (PC) 100 as coordinate information for an input image of the PC 100. In accordance with the input coordinate information, the PC 100 executes processing, such as selection and movement of windows and icons.

Figure 7:
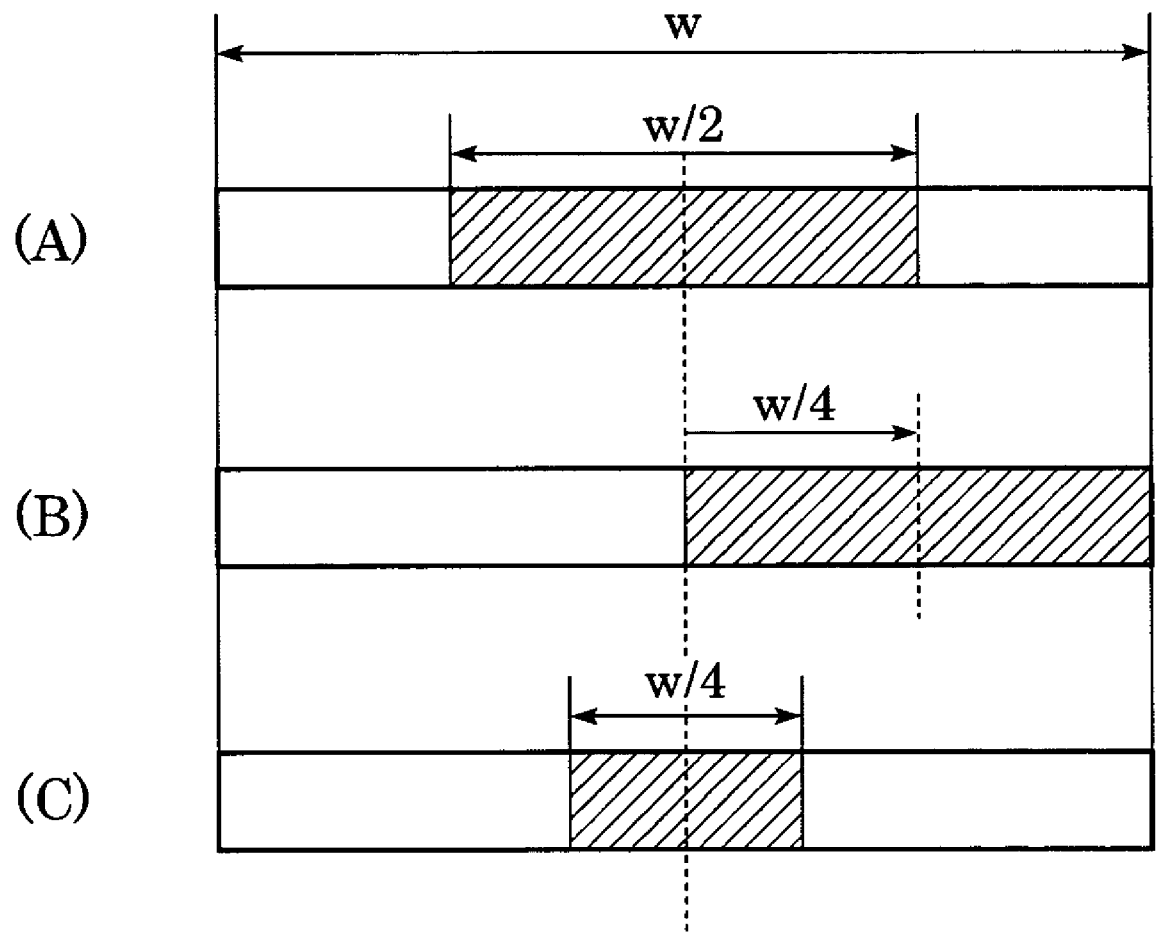
FIGS. 7A, 7B and 7C show respective horizontal scroll bars for the scaled-up images shown in FIGS. 4, 5 and 6.

FIGS. 7A, 7B and 7C illustrate the respective horizontal scroll bars shown in FIGS. 4, 5 and 6. In FIG. 7A, the slicer width W/2 relative to the scroll bar width W represents that the scaled-up image is twice the original image, and alignment between the center of the scroll bar and the center of the slicer represents that the scale-up area is positioned at the center of the original image. In FIG. 7B, the rightward shifted slicer width W/2 represents that the scaled-up image is twice the original image and corresponds to a right half of the original image. In FIG. 7C, the slicer width W/4 relative to the scroll bar width W represents that the scaled-up image is four times the original image, and alignment between the center of the scroll bar and the center of the slicer represents that the scaled-up area is positioned at the center of the original image.

According to this embodiment, as will be seen from the above description, in a display provided with a digitizer, it is possible to visually indicate position information of the scaled-up image relative to the original image, and to shift the display area of the scaled-up image in an intuitively matching way when the scaled-up image is displayed.

Second Embodiment

Figure 8:
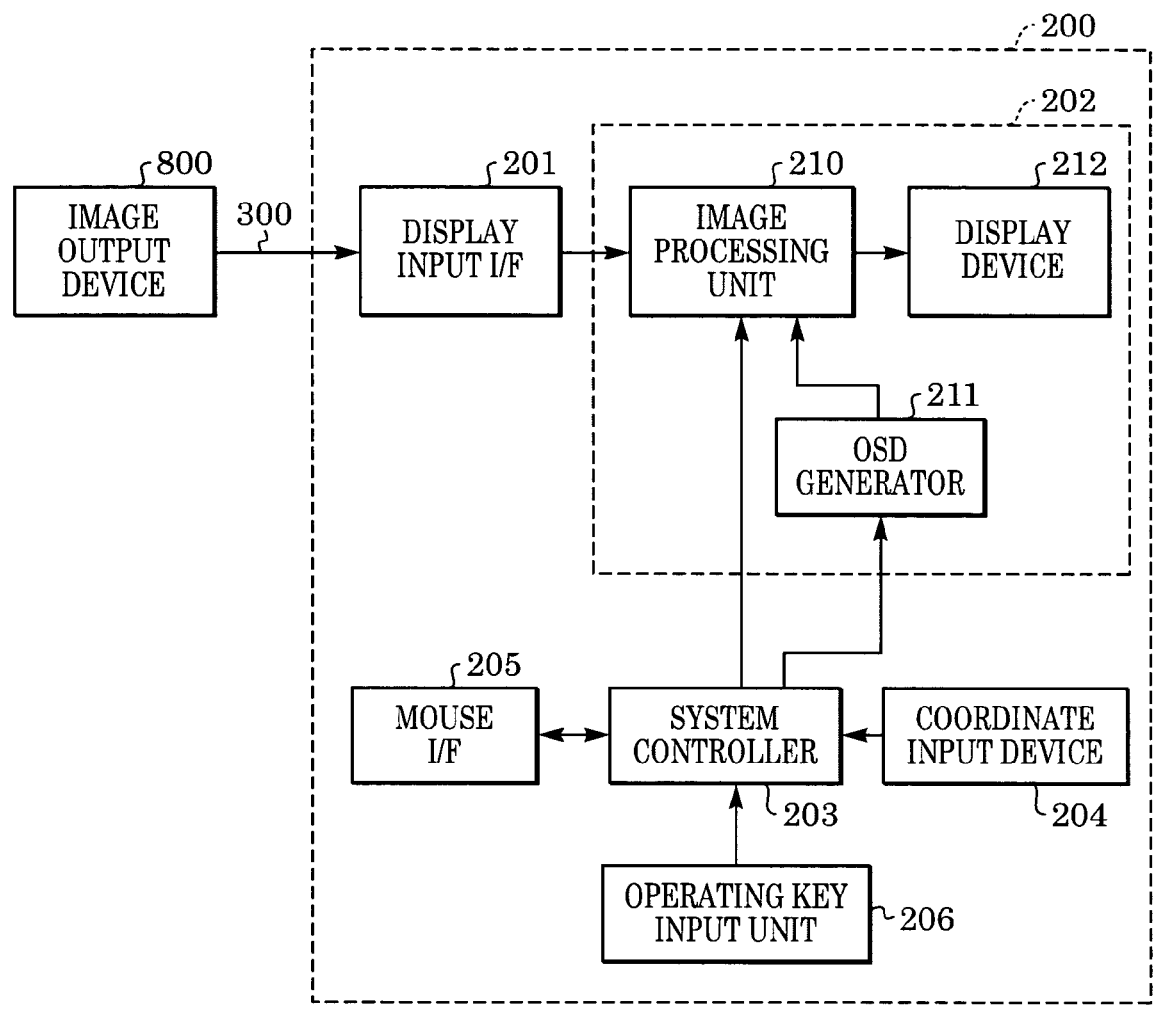
FIG. 8 is a block diagram schematically showing a configuration of an image display system according to a second embodiment of the present invention.

FIG. 8 is a block diagram schematically showing a configuration of an image display system according to a second embodiment of the present invention. An image output device 800 and an image display apparatus 200 are interconnected via a video cable 300.

The image output device 800 is any type of device capable of outputting a video signal, such as a TV tuner or a VCR. An internal configuration of the image display apparatus 200 is the same as that in the first embodiment described above. With that system configuration, this second embodiment can also provide similar advantages to those obtained with the first embodiment.

Other Embodiments

A storage medium that stores program code of software for realizing the functions of any of the above-described embodiments, to a system or an apparatus, and causing a computer (CPU or micro-processing unit (MPU)) in the system or the apparatus to read and execute the program code stored in the storage medium may be supplied. The program code read out of the storage medium realizes the functions of any of the above-described embodiments. Storage media for storing the program code may be, for example, floppy disks, hard disks, optical disks, magneto-optical disks, compact disk read-only memory (CD-ROM), compact disk-recordable (CD-R), magnetic tapes, nonvolatile memory cards, and ROM.

Also, the functions of any of the above-described embodiments may be realized not only by a computer executing program code read out of the storage medium, but also by an operating system (OS) or the like that is running in the computer and executes a part or the whole of the actual processing in accordance with commands from the program code, thereby realizing the functions of any of the above-described embodiments.

Further, program code read out of the storage medium may be written in a memory provided in a function add-on board inserted in the computer or a function add-on unit connected to the computer, and a CPU or the like incorporated in the function add-on board or unit executes a part or the whole of the actual processing in accordance with commands from the program code, thereby realizing the functions of any of the above-described embodiments.

According to the present invention, in an image display system provided with a display having a coordinate input unit, operability in operating a scaled-up display image can be improved. More specifically, the present invention can provide an image display system with higher operability by realizing, in a display having a coordinate input unit, that position information of a scaled-up image relative to an original image is visually indicated, and display of the scaled-up image and shift of a scale-up area of the scaled-up image are performed in an intuitively matching way.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display apparatus comprising:
   an external communication port configured to be coupled to a device interface for inputting an image signal from an information processing apparatus that processes image data and outputs the image signal, the image display apparatus receiving the image signal from the information processing apparatus via the device interface and displaying an image based on the image signal;
   an on-screen display generating unit configured to generate a scroll bar image;
   a coordinate input unit configured to input position information based on a position directly pointed on a display screen without using the device interface;
   a determining unit configured to determine whether the position information from the coordinate input unit points to the scroll bar image;
   an acquiring unit configured to acquire a partial image signal of a partial image corresponding to the position information from the image signal output from the information processing apparatus, without transmitting the position information to the information processing apparatus, when the position information from the coordinate input unit is determined to point to the scroll bar image;
   a synthesizing unit configured to synthesize the scroll bar image with the partial image based on the partial image signal acquired by the acquiring unit; and
   an information transmission unit configured to transmit the position information to the information processing apparatus so that the image signal which is output from the information processing apparatus is changed based on the position information, when the position information from the coordinate input unit is determined to point to outside of the scroll bar image,
   wherein the acquiring unit acquires a changed partial image signal of a changed partial image from the changed image signal.

2. The image display apparatus according to claim 1, further comprising a scale-up display processing unit configured to display a scaled-up image,
   wherein the synthesizing unit displays the scroll bar image in superimposed relation to the scaled-up image displayed by the scale-up display processing unit, and
   the acquiring unit acquires the scroll bar image and a scale-up display image signal in accordance with an input provided by the coordinate input unit.

3. The image display apparatus according to claim 1, wherein the on-screen display generating unit is further configured to display a slicer in the scroll bar image such that a size of the slicer relative to a size of the scroll bar image represents a scale-up rate and a position of the slicer relative to the scroll bar image represents a position of a scaled-up image relative to an original image.

4. An image display system comprising:
an information processing apparatus for processing image data and outputting an image signal via a device interface, and
an image display apparatus external to the information processing apparatus for receiving the image signal and displaying an image on a display screen, the image display apparatus comprising:
an on-screen display generating unit configured to generate a scroll bar image;
a coordinate input unit configured to input position information based on a position directly pointed on the display screen without using the device interface;
a determining unit configured to determine whether the position information from the coordinate input unit points to the scroll bar image;
an acquiring unit configured to acquire a partial image signal of a partial image corresponding to the position information from the image signal output from the information processing apparatus, without transmitting the position information to the information processing apparatus, when the position information from the coordinate input unit is determined to point to the scroll bar image;
a synthesizing unit configured to synthesize the scroll bar image with the partial image based on the partial image signal acquired by the acquiring unit; and
an information transmission unit configured to transmit the position information to the information processing apparatus so that the image signal which is output from the information processing apparatus is changed based on the position information, when the position information from the coordinate input unit is determined to point to outside of the scroll bar image,
wherein the acquiring unit acquires a changed partial image signal of a changed partial image from the changed image signal.

5. The image display system according to claim 4, further comprising a scale-up display processing unit for displaying a scaled-up image,
wherein the synthesizing unit displays the scroll bar image in superimposed relation to the scaled-up image displayed by the scale-up display processing ; and
the acquiring unit acquires the scroll bar image and a scale-up display image signal in accordance with the position information provided by the coordinate input unit.

6. The image display system according to claim 4, wherein the on-screen display generating unit further generates and displays a slicer in the scroll bar image such that a size of the slicer relative to a size of the scroll bar image represents a scale-up rate and a position of the slicer relative to the scroll bar image represents a position of the scaled-up image relative to an original image.

7. An image display method comprising:
establishing a connection between an image display apparatus and an information processing apparatus that processes image data and outputs an image signal, the image display apparatus and the information processing apparatus connected via a device interface;
receiving at the image display apparatus the image signal from the information processing apparatus via the device interface;
generating at the image display apparatus a scroll bar image;
obtaining at the image display apparatus position information based on an instructed position based on a directly pointed display screen without using the device interface;
determining at the image display apparatus whether the position information points to the scroll bar image;
acquiring at the image display apparatus a partial image signal of a partial image corresponding to the position information from the image signal received via the device interface, without transmitting the position information to the information processing apparatus, when the position information is determined to point to the scroll bar image;
synthesizing at the image display apparatus the scroll bar image with the partial image based on the partial image signal acquired by the acquiring step; and
transmitting at the image display apparatus position information to the information processing apparatus so that the image signal which is output from the information processing apparatus is changed based on the position information, when the position information is determined to point to outside of the scroll bar image,
wherein the acquiring acquires a changed partial image signal of a changed partial image from the changed image signal.

8. The image display method according to claim 7, further comprising displaying a scaled-up image,
wherein, the scroll bar image is displayed in superimposed relation to the scaled-up image, and the scroll bar image and a scale-up display image signal are controlled in accordance with the position information.

9. The image display method according to claim 7, further comprising displaying a slicer in the scroll bar image such that a size of the slicer relative to a size of the scroll bar image represents a scale-up rate and a position of the slicer relative to the scroll bar image represents a position of a scaled-up image relative to an original image.

10. A computer readable recording medium storing a control program for causing a computer to implement the image display method of claim 7.

* * * * *